Patented Jan. 20, 1931

1,789,696

UNITED STATES PATENT OFFICE

WILLIAM S. CALCOTT AND WILLIAM A. DOUGLASS, OF PENNS GROVE, NEW JERSEY, ASSIGNORS TO E. I. DU PONT DE NEMOURS & COMPANY, OF WILMINGTON, DELAWARE, A CORPORATION OF DELAWARE

METHOD FOR RETARDING DETERIORATION OF RUBBER

No Drawing. Application filed September 17, 1929. Serial No. 393,314.

This invention relates to a method of treating rubber and the resulting rubber product and is more particularly concerned with a method of treatment whereby a rubber product is obtained which is unusually resistant to deterioration.

It is generally accepted that the rate of deterioration of rubber articles differs greatly depending on various factors, such as the composition of the stock, the form of the article, and the conditions under which it is used. Various materials have heretofore been incorporated in rubber stocks to inhibit deterioration. The preparation of such compounds is in general difficult and expensive.

The primary object of this invention, therefore, is to provide a method for retarding the deterioration of rubber by the use of a new class of compounds, which may be easily and economically prepared from readily available materials.

With these objects in view, it has now been discovered that compounds resulting from the reaction of acetylene with amino compounds may be added to a rubber mix without materially affecting the rate of cure, and that the resulting rubber product, when vulcanized, has much greater resistance to deterioration than rubber containing no antioxidant.

Although the use of a catalyst in the preparation of the compounds concerned is preferred and speeds up the reaction, since acetylene reacts with the amines slowly in the absence of a catalyst, the latter may be dispensed with.

In order to disclose the invention in detail, the following example of an actual embodiment thereof is presented. It should be understood, however, that this example is furnished purely for purposes of illustration and that it is not the intention that the invention be limited to the particular reagents, proportions, or other conditions therein specified.

Example 20 grams of cuprous chloride (catalyst) are added to 558 grams (6 gram mols.) aniline, the mixture heated to 90° C. and dry acetylene introduced with efficient agitation as long as it is absorbed. The reaction is exothermic and when proper control is maintained by the rate of introduction of the acetylene, external heating may not be required to maintain the desired temperature of 90–95° C. When the acetylene ceases to be absorbed, the mass is filtered to remove the catalyst and the excess aniline is then removed, preferably by vacuum distillation. In this instance, approximately two molecules of acetylene combine with one molecule of aniline and the resulting product, although of indefinite constitution, had a melting range of 92.4 to 93.7° C. and contained 9.82% nitrogen. The molecular weight of the product indicated by the depression in the freezing point of benzene was 493.

In order to test the effectiveness of the product in retarding deterioration of rubber, the following test was made:

Two rubber stocks were made up of the following composition, the proportions of which are given by weight:

| | Mix A | Mix B |
|---|---|---|
| Smoked sheets | 50 | 50 |
| Pale crepe | 50 | 50 |
| D. O. T. G. | 0.5625 | 0.5625 |
| Sulfur | 2.75 | 2.75 |
| Zinc oxide | 18.15 | 18.15 |
| Cond. product of acetylene and aniline | 0.0 | 5.0 |

These mixes were vulcanized at 141.5° and aged in the Geer oven at 90° C. The following table gives the data obtained.

TABLE

| | Time of cure | Before aging | | After 4 days oven at 90° | | After 6 days oven at 90° | |
|---|---|---|---|---|---|---|---|
| | | Tensile strength | Elongation break | Tensile strength | Elongation break | Tensile strength | Elongation break |
| Mix A | 30 | 2470 | 800 | 830 | 715 | 110 | 440 |
| | 40 | 2870 | 770 | 1020 | 685 | 140 | 340 |
| | 50 | 2960 | 755 | 560 | 550 | 140 | 360 |
| Mix B | 30 | 2000 | 800 | 2560 | 810 | 2140 | 785 |
| | 40 | 2590 | 795 | 3030 | 775 | 2380 | 735 |
| | 50 | 2710 | 770 | 3160 | 730 | 2290 | 675 |

It will be noted that the stock containing the antioxidant exhibited very much greater resistance to deterioration than the stock containing no antioxidant.

In carrying out the reaction between the amino compound and acetylene, other catalysts than cuprous chloride, which are well known to be suitable in this type of reaction, obviously may be employed, such as, for example, mercurous chloride. Also it will be obvious from the example that many other amino compounds may be employed in place of the aniline illustrated in the example. Thus, the reaction product of acetylene and ortho-toluidine has been tested and found to have anti-deteriorating properties similar to those of the product illustrated in the example. Among other amines or amino compounds which, when reacted with acetylene give products having similar anti-aging properties, may be mentioned for purposes of illustration the following:

(1) Primary monoamines
    Xylidines.
    O and P anisidine, phenetidine.
    Naphthylamines.

(2) Diamines
    Benzidine, tolidine dianisidine.
    m-phenylene diamine, etc.
    Diamino naphthalene, etc.

(3) Alkyl aryl amines
    Mono-ethyl aniline, etc.
    Di-methyl aniline.

(4) Diarylamines
    Diphenylamine, etc.

(5) Primary aliphatic mono-amines
    including methylamine,
        ethylamine,
        butylamine, and
        propylamine.

(6) Secondary aliphatic amines
    such as dimethyl,
        diethyl,
        dipropyl, and
        dibutyl.

(7) Hydroxy amino compounds
    p-amino phenol, etc.

(8) Primary amino compounds
    Hydroxy amino diphenylamine.
    Amino diphenylamine.
    Diamino diphenyl amine.
    Diamino diphenyl methane.
    Diamino diphenyl ketone.
    Diamino benz hydrol.
    Diamino diphenyl ether.
    Amino diphenyl ether.
    Et cetera.

It will be obvious to any chemist that many other amino compounds adapted to react with acetylene and falling within the general classes described above could be employed in the preparation of the anti-aging compounds. The particular compounds indicated above are mentioned merely by way of example. It will, moreover, be obvious from the above examples that the phenyl groups may contain alkyl substituents and hydroxy substituents without materially altering the value of the resulting compounds as antioxidants.

By reason of their unusual effectiveness and their economy of preparation, however, the compounds resulting from the interaction of acetylene and the primary mono aromatic amines represent the preferred class, and of this class in particular, the product resulting from the reaction of acetylene with aniline as described in the example represents the preferred embodiment.

The antioxidants described above may be incorporated into the rubber by any well known means, such as by milling them into the stock upon the rolls of an ordinary mill. Moreover, they can be employed in various rubber compounds and rubber substitutes, such as, for example, gutta percha, balata, and synthetic rubber, and it is therefore to be understood that the invention is not limited to any particular rubber stock or rubber compound.

Also the proportion of the antioxidant employed may be varied within wide limits, depending upon the stock treated and the conditions to be met in use, although under ordinary circumstances about 5% of the antioxidant based on the weight of the rubber has been found to be highly satisfactory.

While we prefer to use the antioxidants of this type by adding the antioxidant to the rubber mix prior to vulcanization, it is also possible to use them for the treatment of vulcanized rubber. In such cases the rubber may be impregnated by either dissolving the antioxidant in a solvent, or by employing it in vapor form.

As many apparent and widely different embodiments of this invention may be made without departing from the spirit and scope thereof, it is to be understood that we do not limit ourselves to the specific embodiments thereof except as defined in the appended claims.

We claim:

1. The process of increasing the resistance of rubber to deterioration which comprises incorporating with the rubber a product resulting from the reaction of acetylene with an amino compound.

2. The process of increasing the resistance of rubber to deterioration which comprises incorporating with the rubber a product resulting from the reaction of substantially two molecules of acetylene and one molecule of a primary mono-phenylamine.

3. In the art of vulcanizing rubber, the step of mixing with the unvulcanized rubber a vulcanizing agent and a compound resulting from the interaction of acetylene and an amino compound, and thereafter vulcanizing.

4. In the art of vulcanizing rubber, the step of mixing with the unvulcanized rubber a vulcanizing agent and a compound resulting from the interaction of acetylene and a primary amine in the presence of a catalyst, and thereafter vulcanizing.

5. In the art of vulcanizing rubber, the step of mixing with the unvulcanized rubber a vulcanizing agent and a compound resulting from the interaction of acetylene and a mono-amine in the presence of a catalyst, and thereafter vulcanizing.

6. In the art of vulcanizing rubber, the step of mixing with the unvulcanized rubber a vulcanizing agent and a compound resulting from the interaction of substantially 2 mols of acetylene and one mol of an aromatic amine, and thereafter vulcanizing.

7. In the art of vulcanizing rubber, the step of mixing with the unvulcanized rubber a vulcanizing agent and a compound resulting from the interaction of substantially 2 mols of acetylene and 1 mol of a primary mono amine, and thereafter vulcanizing.

8. In the art of vulcanizing rubber, the step of mixing with the unvulcanized rubber a vulcanizing agent and a compound resulting from the interaction of substantially 2 mols of acetylene and 1 mol of a primary aromatic amine, and thereafter vulcanizing.

9. In the art of vulcanizing rubber, the step of mixing with the unvulcanized rubber a vulcanizing agent and a compound resulting from the interaction of substantially 2 mols of acetylene and 1 mol of a mono aromatic amine, and thereafter vulcanizing.

10. In the art of vulcanizing rubber, the step of mixing with the unvulcanized rubber a vulcanizing agent and a compound resulting from the interaction in the presence of a catalyst of substantially 2 mols of acetylene and 1 mol of a primary mono aromatic amine, and thereafter vulcanizing.

11. In the art of vulcanizing rubber, the step of mixing with the unvulcanized rubber a vulcanizing agent and a compound resulting from the interaction in the presence of a cataylst of substantially 2 mols of acetylene and 1 mol of a primary mono phenyl amine, and thereafter vulcanizing.

12. In the art of vulcanizing rubber, the step of mixing with the unvulcanized rubber a vulcanizing agent and a nitrogenous compound melting at about 93° C. and resulting from the interaction in the presence of a catalyst of substantially 2 mols of acetylene and 1 mol of aniline, and thereafter vulcanizing.

13. Rubber having incorporated therewith an anti-aging compound resulting from the interaction in the presence of a catalyst of substantially two mols of acetylene and one mol of an amino compound.

14. Rubber having incorporated therewith an anti-aging compound resulting from the interaction in the presence of a catalyst of substantially two mols of acetylene and 1 mol of a primary mono phenyl amine.

15. Vulcanized rubber obtained by incorporating with the rubber prior to vulcanization a vulcanizing agent and a nitrogenous anti-aging compound melting at about 93° C. and obtained by interacting, in the presence of a catalyst, substantially two mols of acetylene and 1 mol of aniline.

16. The process of increasing the resistance of rubber to deterioration which comprises incorporating with the rubber a product resulting from the reaction of acetylene with benzidine, and thereafter vulcanizing.

17. Rubber having incorporated therewith an anti-aging compound resulting from the interaction in the presence of a catalyst of acetylene with benzidine.

18. The process of increasing the resistance of rubber to deterioration which comprises incorporating with the rubber a product resulting from the reaction of acetylene with p-aminophenol, and thereafter vulcanizing.

19. Rubber having incorporated therewith an anti-aging compound resulting from the interaction in the presence of a catalyst of acetylene with p-aminophenol.

In testimony whereof we affix our signatures.

WILLIAM S. CALCOTT.
WILLIAM A. DOUGLASS.